US007925790B2

(12) United States Patent
Xue et al.

(10) Patent No.: US 7,925,790 B2
(45) Date of Patent: Apr. 12, 2011

(54) MIDDLEWARE FILTER AGENT BETWEEN SERVER AND PDA

(75) Inventors: Xin Xue, San Jose, CA (US); Naoyuki Sato, Campbell, CA (US)

(73) Assignees: Sony Corporation, Tokyo (JP); Sony Electronics, Inc., Park Ridge, NY (US)

( * ) Notice: Subject to any disclaimer, the term of this patent is extended or adjusted under 35 U.S.C. 154(b) by 770 days.

(21) Appl. No.: 10/666,402

(22) Filed: Sep. 17, 2003

(65) Prior Publication Data

US 2005/0060435 A1    Mar. 17, 2005

(51) Int. Cl.
*G06F 15/16* (2006.01)
(52) U.S. Cl. ........................................ 709/248; 709/203
(58) Field of Classification Search .................. 709/248, 709/203, 219, 223
See application file for complete search history.

(56) References Cited

U.S. PATENT DOCUMENTS

| | | | |
|---|---|---|---|
| 5,577,232 A | 11/1996 | Priem et al. .................. 395/500 |
| 5,710,908 A | 1/1998 | Man | |
| 5,835,911 A | 11/1998 | Nakagawa et al. | |
| 5,848,064 A | 12/1998 | Cowan | |
| 5,951,639 A | 9/1999 | MacInnis ...................... 709/217 |
| 6,031,830 A | 2/2000 | Cowan ......................... 370/338 |
| 6,189,046 B1 | 2/2001 | Moore et al. | |
| 6,226,744 B1 | 5/2001 | Murphy et al. ............... 713/200 |
| 6,233,252 B1 | 5/2001 | Barker et al. ................ 370/473 |
| 6,272,547 B1 | 8/2001 | McWilliams .................. 709/232 |
| 6,341,316 B1 * | 1/2002 | Kloba et al. .................. 709/248 |
| 6,487,605 B1 | 11/2002 | Leung .......................... 709/245 |
| 6,542,925 B2 * | 4/2003 | Brown et al. ................. 709/208 |
| 6,564,263 B1 * | 5/2003 | Bergman et al. ............. 709/231 |
| 6,567,980 B1 * | 5/2003 | Jain et al. ....................... 725/61 |
| 6,594,228 B1 | 7/2003 | Naidoo et al. ................ 370/217 |
| 6,614,807 B1 | 9/2003 | Mikkila ........................ 370/469 |
| 6,643,684 B1 * | 11/2003 | Malkin et al. ................. 709/206 |
| 6,687,878 B1 * | 2/2004 | Eintracht et al. ............. 715/201 |
| 6,708,217 B1 | 3/2004 | Colson et al. | |
| 6,871,236 B2 | 3/2005 | Fishman et al. ............. 709/246 |
| 6,877,134 B1 * | 4/2005 | Fuller et al. .................. 715/202 |
| 6,920,468 B1 * | 7/2005 | Cousins et al. ..................... 1/1 |

(Continued)

OTHER PUBLICATIONS

SyncML., "SyncML Sync Protocol, version. 1.0.1", Jun. 15, 2001, http://www.syncml.org/docs/syncmlprotocolv10120010615.pdf, pp. 1-61.

(Continued)

*Primary Examiner* — Van H Nguyen
(74) *Attorney, Agent, or Firm* — Haverstock & Owens LLP (57) ABSTRACT

A content server provides content to a first network device during a data synchronization between the two devices. A middleware filter selectively filters content provided by the content server such that selected content is provided to the first network device. The middleware filter is included within a second network device coupled between the content server and the first network device. The second network device acts as a proxy for the first network device to receive the content provided by the content server. The content is provided from the content server according to a subscription service between the content server and the first network device. The first network device is preferably a personal digital assistant (PDA) and the second network device is preferably a personal computer. Alternatively, the content server is coupled to the first network device, without the second network device coupled in between. In the alternative case, the middleware filter is included within the content server, and the content is selectively provided from the middleware filter, on the content server, to the first network device.

60 Claims, 5 Drawing Sheets

U.S. PATENT DOCUMENTS

| | | | |
|---|---|---|---|
| 6,944,185 B2 | 9/2005 | Patki et al. | |
| 6,981,138 B2 | 12/2005 | Douceur et al. | 713/153 |
| 7,016,966 B1 * | 3/2006 | Saulpaugh et al. | 709/230 |
| 7,024,430 B1 * | 4/2006 | Ingraham et al. | 707/201 |
| 7,028,306 B2 | 4/2006 | Boloker et al. | |
| 7,062,515 B1 | 6/2006 | Thomas et al. | |
| 7,062,546 B1 | 6/2006 | Kolar et al. | 709/220 |
| 7,076,555 B1 | 7/2006 | Orman et al. | |
| 7,136,934 B2 | 11/2006 | Carter et al. | 709/248 |
| 7,149,813 B2 | 12/2006 | Flanagin et al. | 709/248 |
| 7,185,070 B2 | 2/2007 | Paul et al. | |
| 7,197,049 B2 | 3/2007 | Engstrom et al. | |
| 7,206,831 B1 * | 4/2007 | Dube et al. | 709/223 |
| 7,376,386 B2 | 5/2008 | Phillips et al. | 455/3.01 |
| 7,404,011 B2 | 7/2008 | Hansmann et al. | |
| 7,404,142 B1 | 7/2008 | Tischer | 715/247 |
| 7,418,482 B1 * | 8/2008 | Lusher et al. | 709/219 |
| 7,432,940 B2 * | 10/2008 | Brook et al. | 345/629 |
| 7,478,047 B2 | 1/2009 | Loyall et al. | |
| 2001/0021994 A1 | 9/2001 | Nash | |
| 2001/0029178 A1 | 10/2001 | Criss et al. | |
| 2001/0034771 A1 | 10/2001 | Hutsch et al. | |
| 2002/0013852 A1 | 1/2002 | Janik | 709/231 |
| 2002/0022453 A1 | 2/2002 | Balog et al. | |
| 2002/0038319 A1 | 3/2002 | Yahagi | 707/513 |
| 2002/0046278 A1 | 4/2002 | Hays et al. | |
| 2002/0059583 A1 | 5/2002 | Kim | 725/32 |
| 2002/0059624 A1 * | 5/2002 | Machida et al. | 725/91 |
| 2002/0073172 A1 | 6/2002 | Armstrong et al. | 709/219 |
| 2002/0091802 A1 | 7/2002 | Paul et al. | |
| 2002/0120885 A1 | 8/2002 | Choi et al. | |
| 2002/0143819 A1 | 10/2002 | Han et al. | 707/513 |
| 2002/0161934 A1 | 10/2002 | Johnson et al. | |
| 2002/0174180 A1 * | 11/2002 | Brown et al. | 709/203 |
| 2002/0194209 A1 | 12/2002 | Bolosky et al. | 707/205 |
| 2002/0194388 A1 | 12/2002 | Boloker et al. | |
| 2002/0198962 A1 | 12/2002 | Horn et al. | 709/218 |
| 2003/0004947 A1 | 1/2003 | Coverston | 707/9 |
| 2003/0014483 A1 | 1/2003 | Stevenson et al. | 709/203 |
| 2003/0041147 A1 | 2/2003 | van den Oord et al. | 709/227 |
| 2003/0093488 A1 | 5/2003 | Yoshida et al. | 709/213 |
| 2003/0120685 A1 | 6/2003 | Duncombe et al. | 707/200 |
| 2003/0140068 A1 | 7/2003 | Yeung | 707/204 |
| 2003/0140088 A1 | 7/2003 | Robinson et al. | 709/202 |
| 2003/0167318 A1 | 9/2003 | Robbin et al. | |
| 2003/0182419 A1 | 9/2003 | Barr et al. | |
| 2003/0182436 A1 | 9/2003 | Henry | 709/232 |
| 2003/0182450 A1 | 9/2003 | Ong et al. | 709/246 |
| 2003/0212608 A1 | 11/2003 | Cliff | 705/26 |
| 2003/0217181 A1 * | 11/2003 | Kiiskinen | 709/248 |
| 2003/0220966 A1 | 11/2003 | Hepper et al. | |
| 2003/0231741 A1 | 12/2003 | Rancu et al. | |
| 2004/0010467 A1 | 1/2004 | Hori et al. | 705/50 |
| 2004/0039834 A1 | 2/2004 | Saunders et al. | 709/231 |
| 2004/0078470 A1 * | 4/2004 | Baumeister et al. | 709/227 |
| 2004/0088731 A1 | 5/2004 | Putterman et al. | |
| 2004/0098379 A1 | 5/2004 | Huang | |
| 2004/0103064 A1 | 5/2004 | Howard et al. | |
| 2004/0128327 A1 * | 7/2004 | Shi et al. | 707/201 |
| 2004/0167960 A1 * | 8/2004 | Kinner et al. | 709/203 |
| 2004/0194279 A1 | 10/2004 | Roy | 29/464 |
| 2004/0205263 A1 * | 10/2004 | Sivaraman et al. | 710/21 |
| 2005/0044250 A1 | 2/2005 | Gay et al. | 709/230 |
| 2005/0055686 A1 | 3/2005 | Buban et al. | 717/170 |
| 2005/0055687 A1 | 3/2005 | Mayer | |
| 2005/0066063 A1 | 3/2005 | Grigorovitch et al. | |
| 2005/0108754 A1 | 5/2005 | Carhart et al. | 725/47 |
| 2005/0228812 A1 | 10/2005 | Hansmann et al. | 707/102 |
| 2005/0267948 A1 | 12/2005 | McKinley et al. | 709/217 |
| 2005/0283797 A1 | 12/2005 | Eldering et al. | |
| 2006/0002340 A1 | 1/2006 | Criss et al. | |
| 2006/0155400 A1 | 7/2006 | Loomis | |
| 2007/0177571 A1 * | 8/2007 | Caulfield et al. | 370/350 |
| 2008/0102844 A1 | 5/2008 | Zhu et al. | |

OTHER PUBLICATIONS

Michael Ehrmantraut, Theo Harder, Hartmut Wittig, Ralf Steinmetz, "The Personal Electronic Program Guide-Towards the Pre-selection of Individual TV Programs", 1996 ACM 0-89791-873-Aug. 11, 1996, pp. 243-250, CIKM 96, Rockville MD USA.

* cited by examiner

MIDDLEWARE FILTER AGENT BETWEEN SERVER AND PDA

FIELD OF THE INVENTION

The present invention relates to the field of synchronizing data between devices. More particularly, the present invention relates to the field of providing a middleware filter agent to filter content sent between a content server and a network device.

BACKGROUND OF THE INVENTION

Communications among web servers, desktop personal computers (PCs), and handheld devices, such as personal digital assistants (PDAs) continues to proliferate. Users desire to share data content among all such devices. Currently, users can download data content from a web server to their PCs and PDAs through an established network connection. When a user synchronizes data between a PDA and a web server, typically a connection is established between the PDA, a cradle for the PDA, the PC connected to the cradle, and the web server coupled to the PC. The order of these connections, and the means by which the data is exchanged during data synchronization are determined by the specific application. However, with most conventional applications, the user is seldom provided with many details related to the data synchronization and the data transferred. Typically, some form of general information is displayed on the PC to inform the user, such as the number of files downloaded. In this case, the PC merely acts as a data transport tool between the web server and the PDA.

Further, PCs and PDAs include different device specifications. For example, the PC includes more memory and greater processing power than the PDA, yet the PDA is easier to carry and more convenient. Due to these different characteristics, some content data types are more suitable for the PC rather than the PDA, while other content data types are more suitable for the PDA.

SUMMARY OF THE INVENTION

In a preferred embodiment, a content server provides content to a first network device. During data synchronization between the content server and the first network device, content is sent from the content server to the first network device via a second network device. The second network device is coupled in between the content server and the first network device. The second network device includes a middleware filter to selectively filter the content provided from the content server to the first network device. The middleware filter includes information related to the first network device, such as device specifications. The content sent by the content server includes meta data that defines content-related information, such as attribute-value pairs associated with the content. The meta data is preferably added to the content by the content server. The second network device receives the content sent from the content server. The middleware filter reads the meta data of the content received by the second network device, and applies rules to the read meta data and the stored information related to the first network device to determine if the content is to be forwarded to the first network device. If the middleware filter determines that the content should be forwarded, then the content is sent to the first network device. Otherwise, the content remains on the second network device and is not forwarded to the first network device.

In one aspect of the present invention, a network of devices to filter synchronized data includes a content server to store content, a first network device, and a middleware filter coupled to the first network device and to the content server such that during a data synchronization, content is received by the middleware filter from the content server according to the data synchronization and the middleware filter selectively sends the received content to the first network device. The content sent by the content server can include meta data. The meta data can include a data type of the content. The middleware filter reads the meta data of the content received from the content server and sends the content to the first network device if the data type of the read meta data matches an authorized data type associated with the first network device. The middleware filter stores the authorized data type of the first network device. The meta data can include an authorized network device type. The middleware filter reads the meta data of the content received from the content server and sends the content to the first network device if the authorized network device type of the read meta data matches a network device type associated with the first network device. The middleware filter stores the network device type of the first network device. The meta data can be added to the content by the content server. The meta data can include data synchronization information corresponding to the data synchronization. The network of devices can also include a display coupled to the middleware filter to display the data synchronization information. The data synchronization can be a one-way data synchronization. The data synchronization can be a bi-directional data synchronization. The second network device can comprise a personal computer. The first network device can comprise a personal digital assistant. The content server can comprise a web server. The second network device can comprise a server. The network of devices can also include a second network device coupled in between the content server and the first network device, wherein the second network device includes the middleware filter. The content server can include the middleware filter.

In another aspect of the present invention, a network of devices to filter synchronized data includes a content server to store content, a personal digital assistant, and a personal computer coupled to the personal digital assistant and to the content server, wherein the personal computer includes a middleware filter such that during a data synchronization, content received by the personal computer from the content server according to the data synchronization is selectively sent to the personal digital assistant by the personal computer according to the middleware filter. The content sent by the content server can include meta data. The meta data can include a data type of the content. The personal computer reads the meta data of the content received from the content server and sends the content to the personal digital assistant if the data type of the read meta data matches an authorized data type associated with the personal digital assistant. The personal computer stores the authorized data type of the personal digital assistant. The meta data can include an authorized network device type. The personal computer reads the meta data of the content received from the content server and sends the content to the personal digital assistant if the authorized network device type of the read meta data matches a network device type associated with the personal digital assistant. The personal computer stores the network device type of the personal digital assistant. The meta data can be added to the content by the content server. The meta data can include data synchronization information corresponding to the data synchronization. The personal computer can display the data synchronization information. The data synchronization can be a one-way data synchronization. The data synchronization can be a bi-directional data synchronization. The content server can comprise a web server.

In yet another aspect of the present invention, a method of filtering synchronized data includes determining content to be sent from a content server to a first network device during a data synchronization, sending the content from the content server to a second network device coupled between the content server and the first network device, wherein the second network device includes a middleware filter, selectively filtering the content according to the middleware filter, and sending the filtered content from the second network device to the first network device. The content sent from the content server can include meta data. The meta data can include a data type of the content. Selectively filtering the content can include reading the meta data of the content received from the content server by the middleware filter, matching the data type of the read meta data to an authorized data type associated with the first network device, and sending the content to the first network device if the data type of the read meta data matches the authorized data type associated with the first network device. The middleware filter stores the authorized data type of the first network device. The meta data can include an authorized network device type. Selectively filtering the content can include reading the meta data of the content received from the content server by the middleware filter, matching the authorized network device type of the read meta data to a network device type associated with the first network device, and sending the content to the first network device if the authorized network device type of the read meta data matches the network device type associated with the first network device. The middleware filter stores the network device type of the first network device. The meta data can be added to the content by the content server. The meta data can include data synchronization information corresponding to the data synchronization. The method cam also include displaying the data synchronization information. The data synchronization can be a one-way data synchronization. The data synchronization can be a bi-directional data synchronization. The second network device can comprise a personal computer. The first network device can comprise a personal digital assistant. The content server can comprise a web server. The second network device can comprise a server.

In still yet another aspect of the present invention, a method of filtering synchronized data includes determining content to be sent from a content server to a first network device during a data synchronization, wherein the first network device includes a middleware filter, selectively filtering the determined content according to the middleware filter, and sending the filtered content from the content server to the first network device. The content sent from the content server can include meta data. The meta data can include a data type of the content. Selectively filtering the determined content can include reading the meta data of the determined content by the middleware filter, matching the data type of the read meta data to an authorized data type associated with the first network device, and sending the determined content to the first network device if the data type of the read meta data matches the authorized data type associated with the first network device. The middleware filter stores the authorized data type of the first network device. The meta data can include an authorized network device type. Selectively filtering the determined content can include reading the meta data of the determined content by the middleware filter, matching the authorized network device type of the read meta data to a network device type associated with the first network device, and sending the determined content to the first network device if the authorized network device type of the read meta data matches the network device type associated with the first network device. The middleware filter stores the network device type of the first network device. The meta data can be added to the content by the content server. The meta data can include data synchronization information corresponding to the data synchronization. The method can also include displaying the data synchronization information. The data synchronization can be a one-way data synchronization. The data synchronization can be a bi-directional data synchronization. The first network device can comprise a personal digital assistant. The content server can comprise a web server. In another aspect of the present invention, an apparatus to filter synchronized data includes a middleware filter such that during a data synchronization, content is received by the apparatus from a content server according to the data synchronization, and the received content is selectively sent to a network device by the apparatus according to the middleware filter. The content sent by the content server can include meta data. The meta data can include a data type of the content. The middleware filter reads the meta data of the content received from the content server and sends the content to the network device if the data type of the read meta data matches an authorized data type associated with the network device. The middleware filter stores the authorized data type of the network device. The meta data can include an authorized network device type. The middleware filter reads the meta data of the content received from the content server and sends the content to the network device if the authorized network device type of the read meta data matches a network device type associated with the network device. The middleware filter stores the network device type of the network device. The meta data can be added to the content by the content server. The meta data can include data synchronization information corresponding to the data synchronization. The apparatus can also include a display to display the data synchronization information. The data synchronization can be a one-way data synchronization. The data synchronization can be a bi-directional data synchronization. The apparatus can comprise a personal computer. The network device can comprise a personal digital assistant. The content server can comprise a web server. The apparatus can comprise a server.

DETAILED DESCRIPTION OF THE EMBODIMENTS

Embodiments of the present invention include a content server, a middleware filter and a first network device. The content server provides content to the first network device during a data synchronization between the two devices. The middleware filter selectively filters the content provided by the content server such that selected content is provided to the first network device. The middleware filter is preferably included within a second network device coupled between the content server and the first network device. In this manner, the second network device acts as a proxy for the first network device to receive the content provided by the content server. The content is preferably provided from the content server according to a subscription service between the content server and the first network device. The first network device is preferably a personal digital assistant (PDA) and the second network device is preferably a personal computer. The term "content" as used herein preferably refers to data of any data type, including but not limited to audio, video, graphics, text, and any combination thereof. In an alternative embodiment, the content server is coupled to the first network device, without the second network device coupled in between. The middleware filter is included within the content server, and the content is selectively provided from the middleware filter, on the content server, to the first network device.

In the preferred embodiment of the present invention, content provided by the content server includes meta data that describes attributes of the content, such as the size of the content file and the data type. Attributes can also include information related to an end-user network device on which the content is to be used. The middleware filter preferably stores attributes, or specifications, of the network devices, such as the first network device, to which content received from the content server is to be sent during a data synchronization. The middleware filter uses the meta data of the received content and the attributes of the first network device to selectively filter the content before the content is provided to the first network device. Selective filtering is preferably performed according to rules defined within the middleware filter.

Figure 1:
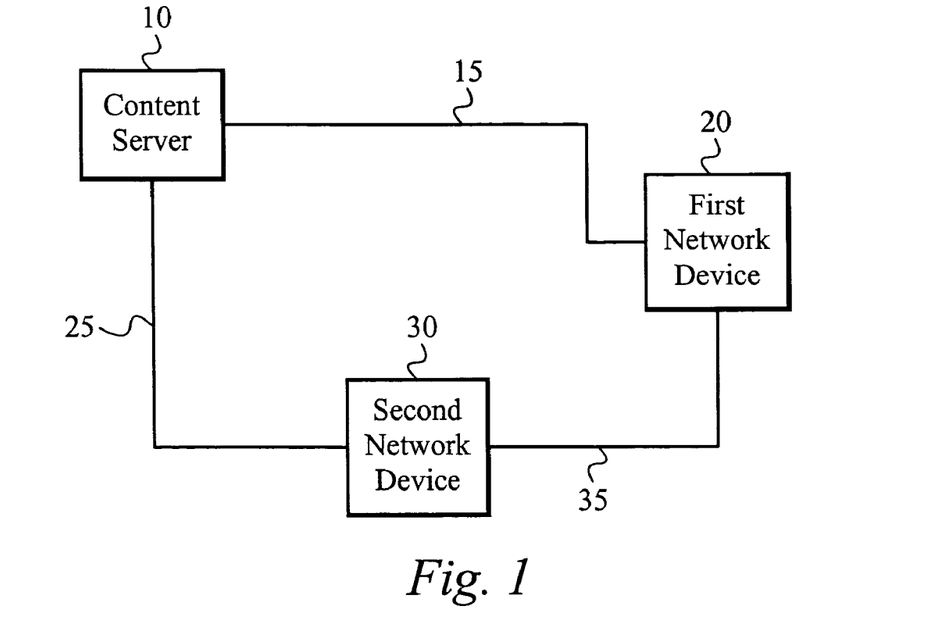
FIG. 1 illustrates an exemplary network of devices.

FIG. 1 illustrates an exemplary network of devices including a content server 10, a first network device 20, and a second network device 30. The first network device 20 is coupled to the content server 10 via the network connection 15. The first network device 20 is coupled to the second network device 30 via the network connection 35. The content server 10 is coupled to the second network device 30 via the network connection 25. Network connections 15, 25, and 35 can be of any conventional type including wired or wireless network connections. The content server 10 includes content which is to be provided to coupled network devices, including the first network device 20 and the second network device 30. The content is preferably provided as part of a subscription service, where the service is entered into as a service agreement between the content server 10 and a user. As part of the service, content is provided by the content server 10 to a network device during a data synchronization between the content server 10 and the network device.

Figure 2:
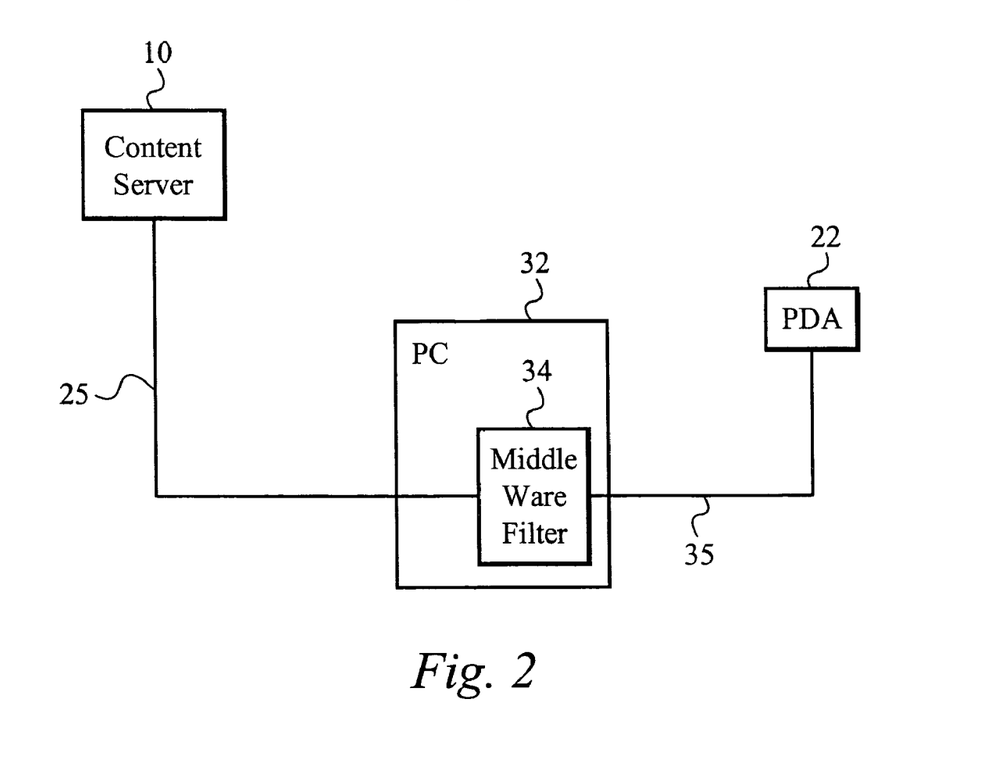
FIG. 2 illustrates a first and preferred embodiment of the network of devices implementing the middleware filter according to the present invention.

The present invention includes a middleware filter that selectively filters the content provided by the content server 10. FIG. 2 illustrates a first and preferred embodiment of the network of devices implementing the middleware filter according to the present invention. Within the drawings, the same elements as to FIGS. 1-7 are labeled with the same numbers. In the preferred embodiment, the middleware filter resides on a proxy network device, where the proxy network device acts as a proxy for an end-user network device. The content is provided by the content server 10 to the proxy network device, where the middleware filter selectively filters the content ultimately destined for the end-user network device. In FIG. 2, a personal computer (PC) 32 performs as the proxy network device, and a personal digital assistant (PDA) 22 performs as the end-user network device. A middleware filter 34 resides within the PC 32. Content from the content server 10 is preferably sent over network connection 25 during a data synchronization process. The proxy network device, the PC 32, preferably manages the subscription service with the content server 10 and any necessary set-up for data transfer. Set-up includes establishing a data channel over the network connection 25. The specifications of the data channel may vary depending on the type of content sent. For example, where the content is a movie or a game, a movie channel or a game channel is established. Specific channels may correspond to specific output ports on the content server 10, or other various characteristics, as necessary.

Content provided by the content server 10 is preferably organized using XML. XML is a document mark-up language used for defining structured information. Meta data associated with the content is provided using tags that include attribute-value pairs. The meta data includes content-specific information such as content file size, content data type, content compatible devices, attributes of the content, and the like. Exemplary tags including meta data attribute-value pairs can take the form of:

```
<content>
    <name> spiderman </name>
    <length> long </length>
    <device> PC </device>
</content>
```

The actual organization and arrangement of the meta data is application driven. The meta data can also include messages to be displayed to a user during data synchronization. Preferably, the display messages are displayed on the PC 32. Alternatively, the display messages are displayed on the PDA 22. The display messages preferably provide information related to the data synchronization, such as the data type of the content and any other attributes of the content.

Data synchronization is preferably established between the PDA 22 and the content server 10. Content to be synchronized is determined, and the determined content is sent from the content server 10 to the PC 32. The middleware filter 34 within the PC 32 receives the content and reads the meta data. The middleware filter 34 also includes device-specific information related to the PDA 22. Using the read meta data from the received content, and the PDA 22 information, the middleware filter 34 applies rules to determine if the content is to be sent from the PC 32 to the PDA 22. An exemplary rule compares the data type of the content to the data types that the PDA is capable of running, or is authorized to run. If the PDA 22 is capable, or authorized, to run the data type of the content then the content is sent from the PC 32 to the PDA 22. If the data type is not capable, or not authorized, to run on the PDA 22 then the content is not sent to the PDA 22. Another exemplary rule compares a device type of the PDA 22 with the device types the content is capable, or authorized to run on, as indicated in the meta data of the content. If there is a match, the content is sent to the PDA 22. If there is not a match, then the content is not sent to the PDA 22. In this manner, the content received by the PC 32 is selectively filtered by the middleware filter 34, such that only select content received by the PC 32 is sent to the PDA 22.

Data synchronization can also be performed where the content is first sent from the content server 10 the PC 32, and then second, at a later time, the PDA 22 synchronizes with the PC 32 and the filtered content is sent to the PDA 22 from the PC 32.

This preferred method of synchronizing data is particularly advantageous when the end-user network device, such as the PDA 22, does not know the data type of the content being sent from the content server 10.

Figure 3:
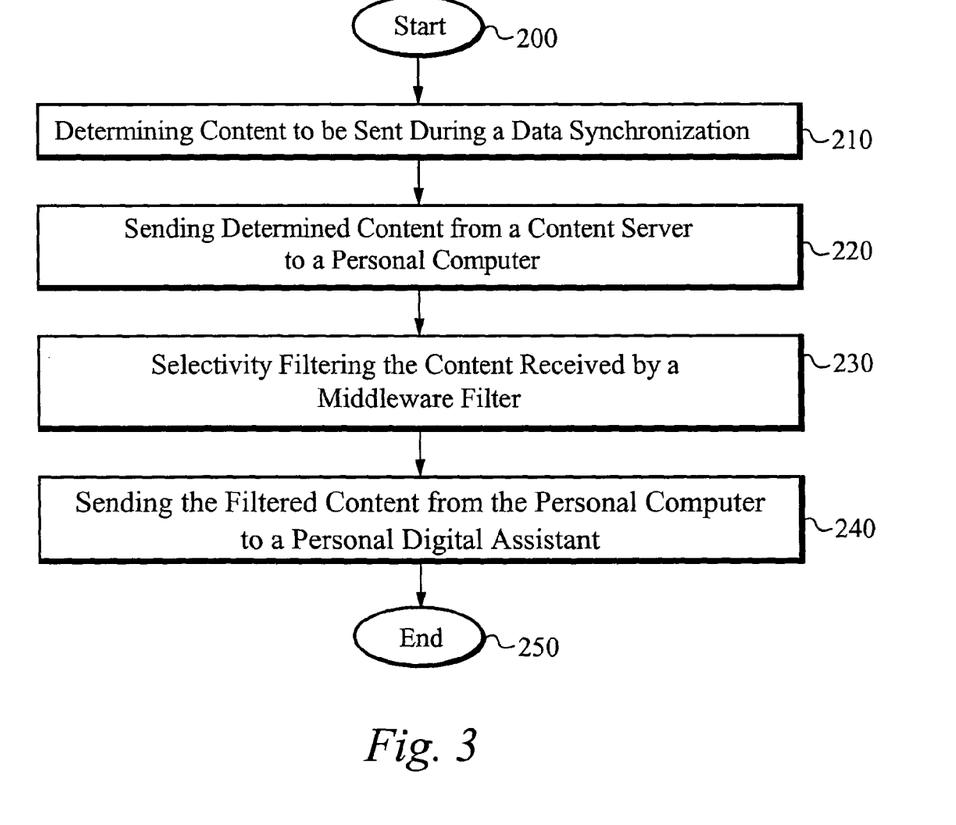
FIG. 3 illustrates a preferred method of filtering synchronized data.

FIG. 3 illustrates a preferred method of filtering synchronized data. The preferred method relates to the preferred network of devices illustrated in FIG. 2. The preferred method starts at the step 200. At the step 210, content to be sent during a data synchronization between the content server 10 and the PDA 22 is determined. At the step 220, the determined content is sent from the content server 10 to the PC 32. At the step 230, the middleware filter 34 within the PC 32 selectively filters the content received by the PC 32 at the step 220. At the step 240, the filtered content is sent from the personal computer 32 to the PDA 22. The preferred method ends at the step 250.

Figure 4:
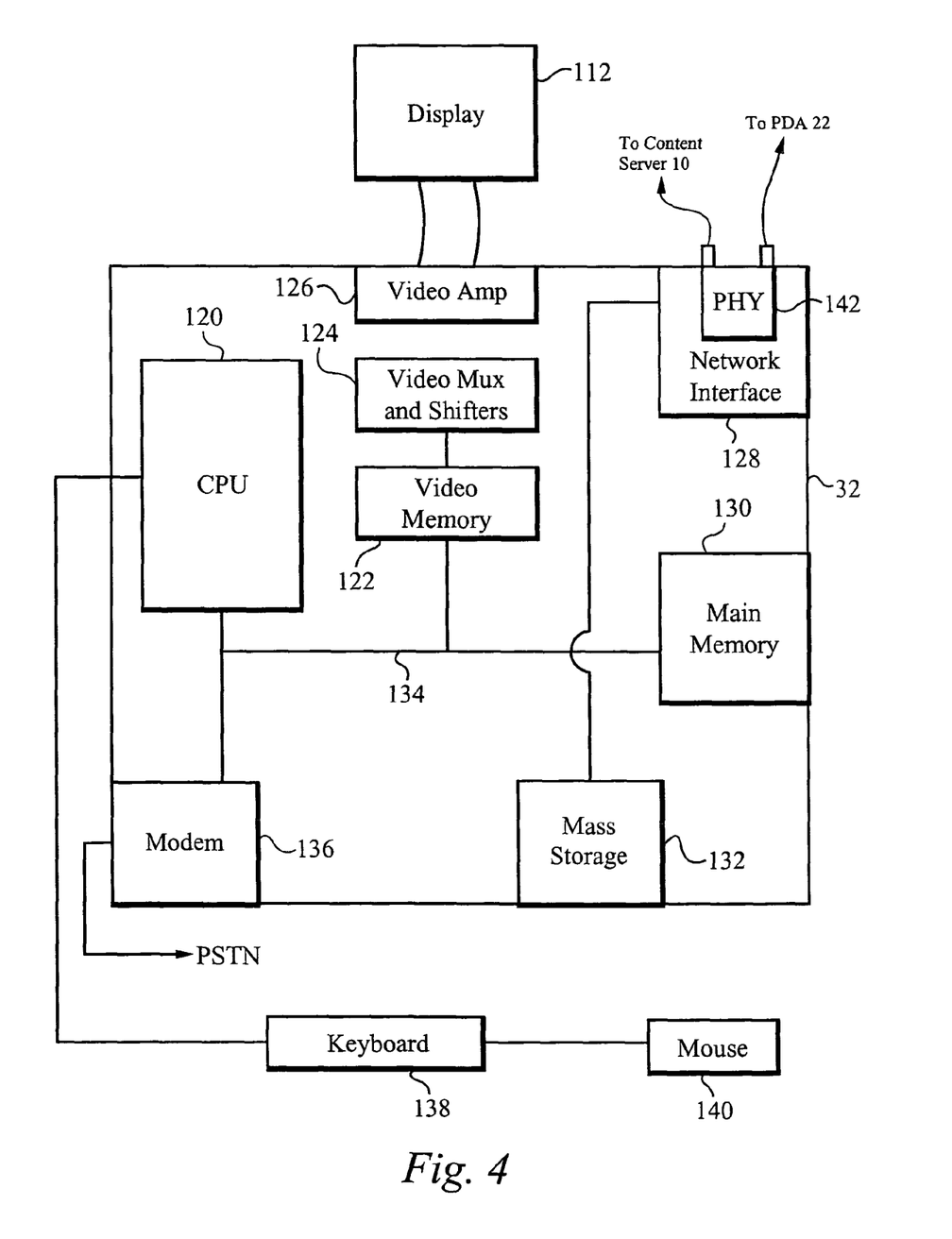
FIG. 4 illustrates an exemplary block diagram of the internal components of the personal computer implementing the middleware filter illustrated in FIG. 2.

An exemplary block diagram of the internal components of the personal computer (PC) 32 is illustrated in FIG. 4. The PC 32 includes a central processor unit (CPU) 120, a main memory 130, a video memory 122, a mass storage device 132, a modem 136, and a network interface circuit 128, all coupled together by a conventional bi-directional system bus 134. The interface circuit 128 includes a physical interface circuit 142 for sending and receiving communications over the network connection. The physical interface circuit 142 is coupled to the content server 10 and the PDA 22. In the preferred embodiment of the present invention, the interface circuit 128 is implemented on a network interface card within the PC 32. However, it should be apparent to those skilled in the art that the interface circuit 128 can be implemented within the PC 32 in any other appropriate manner, including building the interface circuit onto the motherboard itself. It should also be apparent to those skilled in the art that more or less network connections can be provided by the interface circuit 128 than the two network connections illustrated in FIG. 3. The interface circuit 128 provides a preferred high-speed connection to the Internet, intranet, or other dedicated network. The network interface circuit 128 also provides an interface for the PC 32 to perform data synchronization. Alternatively, the modem 136 provides a dial-up connection via the public switched telephone network (PSTN) to access the Internet. The mass storage device 132 may include both fixed and removable media using any one or more of magnetic, optical or magneto-optical storage technology or any other available mass storage technology. The system bus 134 contains an address bus for addressing any portion of the memory 122 and 130. The system bus 134 also includes a data bus for transferring data between and among the CPU 120, the main memory 130, the video memory 122, the mass storage device 132, the modem 136, and the interface circuit 128.

The PC 32 is also coupled to a number of peripheral input and output devices including the keyboard 138, the mouse 140 and the associated display 112. The keyboard 138 is coupled to the CPU 120 for allowing a user to input data and control commands into the PC 32. A conventional mouse 140 is coupled to the keyboard 138 for manipulating graphic images on the display 112 as a cursor control device.

A port of the video memory 122 is coupled to a video multiplex and shifter circuit 124, which in turn is coupled to a video amplifier 126. The video amplifier 126 drives the display 112. The video multiplex and shifter circuitry 124 and the video amplifier 126 convert pixel data stored in the video memory 122 to raster signals suitable for use by the display 112.

The middleware filter of the present invention is preferably implemented as software, which utilizes the memory and processing capabilities of the network device on which it is installed. In the preferred embodiment, the middleware filter is installed on the personal computer 32.

Figure 5:
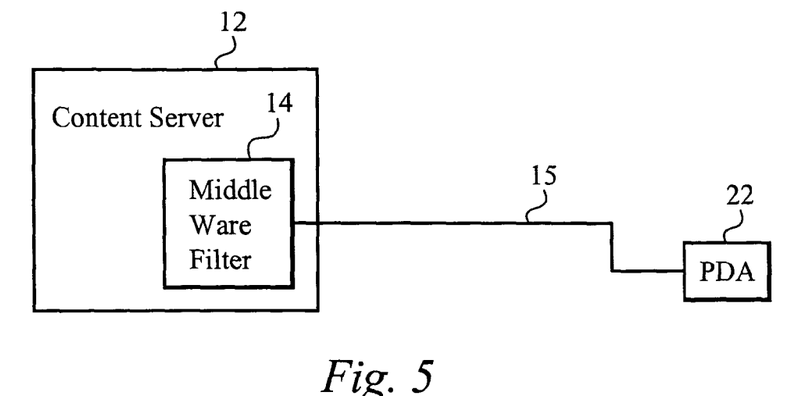
FIG. 5 illustrates a second embodiment of the network of devices implementing the middleware filter according to the present invention.

FIG. 5 illustrates a second embodiment of the network of devices implementing the middleware filter according to the present invention. In the second embodiment, the PDA 22 is coupled to a content server 12 via the network connection 15. The content server 12 is the same as the content server 10 with the addition of a middleware filter 14. The middleware filter 14 operates in a manner similar to that of the middleware filter 34 described in relation to FIG. 2. In the second embodiment illustrated in FIG. 5, the content server 12 manages the subscription service with the PDA 22 and any necessary set-up for data transfer.

In the second embodiment, data synchronization is preferably established between the PDA 22 and the content server 12. Content to be synchronized is determined. The meta data of the determined content is read by the middleware filter 14. Using the read meta data from the determined content, and the stored PDA 22 information, the middleware filter 14 applies rules to determine if the content is to be sent from the content server 12 to the PDA 22. In this manner, the content to be synchronized between the content server 12 and the PDA 22 is selectively filtered by the middleware filter 14, such that the PDA 22 only receives select content.

Figure 6:
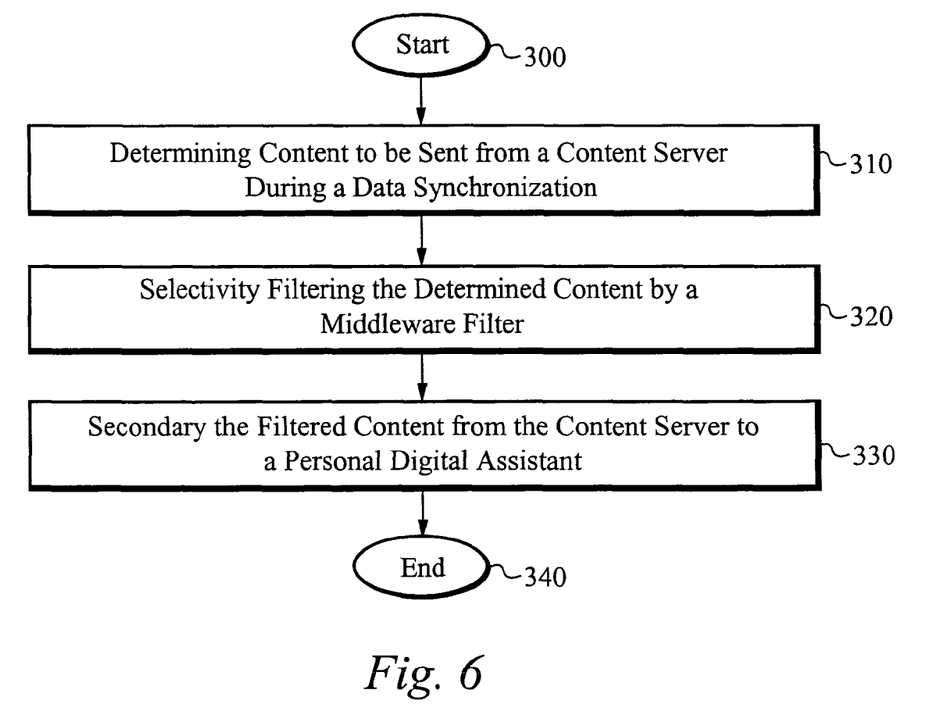
FIG. 6 illustrates an alternative method of filtering synchronized data.

FIG. 6 illustrates an alternative method of filtering synchronized data. The alternative method relates to the alternate network of devices illustrated in FIG. 5. The alternative method starts at the step 300. At the step 310, content to be sent during a data synchronization between the content server 12 and the PDA 22 is determined. At the step 320, the middleware filter 14 within the content server 12 selectively filters the content determined at the step 310. At the step 330, the filtered content is sent from the content server 12 to the PDA 22. The alternative method ends at the step 340.

Figure 7:
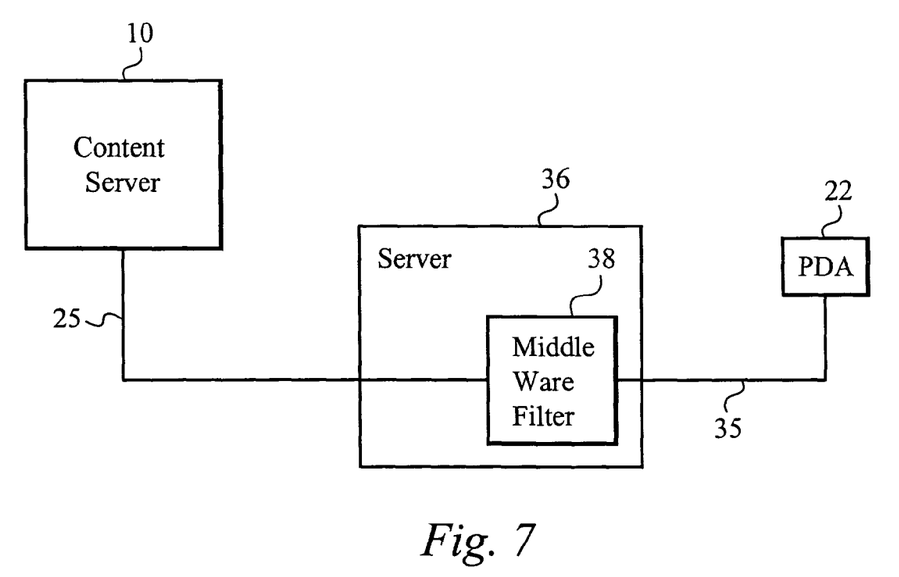
FIG. 7 illustrates a third embodiment of the network of devices implementing the middleware filter according to the present invention.

FIG. 7 illustrates a third embodiment of the network of devices implementing the middleware filter according to the present invention. In the third embodiment, the PC 32 of FIG. 2 is replaced by another server 36. In this case, the server 36 performs as a distribution point for the content stored in the content server 10. The server 36 includes a middleware filter 38. The selective filtering of content transferred during a data synchronization between the content server 10 and the PDA 22, is similar to that described in relation to the first embodiment illustrated in FIG. 2.

In operation, a content server provides content to a first network device. During data synchronization between the content server and the first network device, content to be synchronized is sent from the content server to the first network device via a second network device. The second network device is coupled in between the content server and the first network device. The second network device includes a middleware filter to selectively filter the content provided from the content server to the first network device. The middleware filter includes information related to the first network device, such as device specifications. The content includes meta data that defines content-related information, such as attribute-value pairs associated with the content. The meta data is preferably added to the content by the content server. The second network device receives the content sent from the content server. The middleware filter reads the meta data of the content received by the second network device, and applies rules to the read meta data and the stored information related to the first network device to determine if the content is to be forwarded to the first network device. If the middleware filter determines that the content should be forwarded, then the content is sent to the first network device. Otherwise, the content remains on the second network device and is not forwarded to the first network device.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention. Specifically, although the aforementioned embodiments of the present invention have been described in relation to a one-way data synchronization from the content server to the first network device, data synchronization can also be bi-directional.

What is claimed is:

1. A network of devices to filter synchronized data, the network of devices comprising:
   a. a content server to store content;
   b. a first network device;
   c. a second network device; and
   d. a middleware filter included within the second network device, the second network device coupled to the first network device and to the content server such that during a data synchronization, content is received by the middleware filter from the content server according to the data synchronization and the middleware filter is programmed to selectively filter the content resulting in filtered content and send only the filtered content to the first network device, wherein the middleware filter selectively filters the content in response to meta data within the content, wherein the meta data comprises a data type of the content,
      wherein the middleware filter reads the meta data of the content received from the content server and sends the content to the first network device if the data type of the read meta data matches an authorized data type associated with the first network device,
      wherein the middleware filter stores the authorized data type of the first network device, and
      wherein the meta data is added to the content by the content server.

2. The network of devices of claim 1 wherein the meta data includes an authorized network device type.

3. The network of devices of claim 2 wherein the middleware filter reads the meta data of the content received from the content server and sends the content to the first network device if the authorized network device type of the read meta data matches a network device type associated with the first network device.

4. The network of devices of claim 3 wherein the middleware filter stores the network device type of the first network device.

5. The network of devices of claim 1 wherein the meta data includes data synchronization information corresponding to the data synchronization.

6. The network of devices of claim 5 further comprising a display coupled to the middleware filter to display the data synchronization information.

7. The network of devices of claim 1 wherein the data synchronization is a one-way data synchronization.

8. The network of devices of claim 1 wherein the data synchronization is a bi-directional data synchronization.

9. The network of devices of claim 1 wherein the second network device comprises a personal computer.

10. The network of devices of claim 1 wherein the first network device comprises a personal digital assistant.

11. The network of devices of claim 1 wherein the content server comprises a web server.

12. The network of devices of claim 1 wherein the second network device comprises a server.

13. A network of devices to filter synchronized data, the network of devices comprising:
   a. a content server to store content;
   b. a personal digital assistant; and
   c. a personal computer coupled to the personal digital assistant and to the content server, wherein the personal computer includes a middleware filter programmed such that during a data synchronization, content received by the personal computer from the content server according to the data synchronization is selectively filtered according to the middleware filter, resulting in filtered content, wherein only the filtered content is sent to the personal digital assistant by the personal computer, wherein the middleware filter selectively filters the content in response to meta data within the content, wherein the meta data comprises a data type of the content,
      wherein the personal computer reads the meta data of the content received from the content server and sends the content to the personal digital assistant if the data type of the read meta data matches an authorized data type associated with the personal digital assistant,
      wherein the personal computer stores the authorized data type of the personal digital assistant, and
      wherein the meta data is added to the content by the content server.

14. The network of devices of claim 13 wherein the meta data includes an authorized network device type.

15. The network of devices of claim 14 wherein the personal computer reads the meta data of the content received from the content server and sends the content to the personal digital assistant if the authorized network device type of the read meta data matches a network device type associated with the personal digital assistant.

16. The network of devices of claim 15 wherein the personal computer stores the network device type of the personal digital assistant.

17. The network of devices of claim 13 wherein the meta data includes data synchronization information corresponding to the data synchronization.

18. The network of devices of claim 17 wherein the personal computer displays the data synchronization information.

19. The network of devices of claim 13 wherein the data synchronization is a one-way data synchronization.

20. The network of devices of claim 13 wherein the data synchronization is a bi-directional data synchronization.

21. The network of devices of claim 13 wherein the content server comprises a web server.

22. A method of filtering synchronized data, the method comprising:
   a. determining content to be sent from a content server to a first network device during a data synchronization;
   b. sending the content from the content server to a second network device coupled between the content server and the first network device, wherein the second network device includes a middleware filter;
   c. selectively filtering the content according to the middleware filter in response to meta data contained within the content, wherein the meta data comprises a data type of the content; and d. sending only the filtered content from the second network device to the first network device, wherein selectively filtering the content includes reading the meta data of the content received from the content server by the middleware filter, matching the data type of the read meta data to an authorized data type associated with the first network device, and sending the content to the first network device if the data type of the read meta data matches the authorized data type associated with the first network device, wherein the middleware filter stores the authorized data type of the first network device, and wherein the meta data is added to the content by the content server.

23. The method of claim 22 wherein the meta data includes an authorized network device type.

24. The method of claim 23 wherein selectively filtering the content includes reading the meta data of the content received from the content server by the middleware filter, matching the authorized network device type of the read meta data to a network device type associated with the first network device, and sending the content to the first network device if the authorized network device type of the read meta data matches the network device type associated with the first network device.

25. The method of claim 24 wherein the middleware filter stores the network device type of the first network device.

26. The method of claim 22 wherein the meta data includes data synchronization information corresponding to the data synchronization.

27. The method of claim 26 further comprising displaying the data synchronization information.

28. The method of claim 22 wherein the data synchronization is a one-way data synchronization.

29. The method of claim 22 wherein the data synchronization is a bi-directional data synchronization.

30. The method of claim 22 wherein the second network device comprises a personal computer.

31. The method of claim 22 wherein the first network device comprises a personal digital assistant.

32. The method of claim 22 wherein the content server comprises a web server.

33. The method of claim 22 wherein the second network device comprises a server.

34. A method of filtering synchronized data, the method comprising:

a. determining content to be sent from a content server to a first network device during a data synchronization, wherein the content server includes a middleware filter;

b. selectively filtering the determined content according to the middleware filter in response to meta data contained within the content, wherein the meta data comprises a data type of the content; and c. sending only the filtered content from the content server to the first network device, wherein selectively filtering the determined content includes reading the meta data of the determined content by the middleware filter, matching the data type of the read meta data to an authorized data type associated with the first network device, and sending the determined content to the first network device if the data type of the read meta data matches the authorized data type associated with the first network device, wherein the middleware filter stores the authorized data type of the first network device, and wherein the meta data is added to the content by the content server.

35. The method of claim 34 wherein the meta data includes an authorized network device type.

36. The method of claim 35 wherein selectively filtering the determined content includes reading the meta data of the determined content by the middleware filter, matching the authorized network device type of the read meta data to a network device type associated with the first network device, and sending the determined content to the first network device if the authorized network device type of the read meta data matches the network device type associated with the first network device.

37. The method of claim 36 wherein the middleware filter stores the network device type of the first network device.

38. The method of claim 34 wherein the meta data includes data synchronization information corresponding to the data synchronization.

39. The method of claim 38 further comprising displaying the data synchronization information.

40. The method of claim 34 wherein the data synchronization is a one-way data synchronization.

41. The method of claim 34 wherein the data synchronization is a bi-directional data synchronization.

42. The method of claim 34 wherein the first network device comprises a personal digital assistant.

43. The method of claim 34 wherein the content server comprises a web server.

44. An apparatus including at least one processor to filter synchronized data, the apparatus comprising:

a middleware filter programmed such that during a data synchronization, content is received by the apparatus from a content server according to the data synchronization, and the received content is selectively sent to a network device by the apparatus according to the middleware filter, wherein the received content is selectively filtered by the middleware filter and wherein only the filtered content is sent to the network device in response to meta data within the received content, wherein the meta data comprises a data type of the received content, wherein the middleware filter reads the meta data of the content received from the content server and sends the content to the network device if the data type of the read meta data matches an authorized data type associated with the network device, wherein the middleware filter stores the authorized data type of the network device, and wherein the meta data is added to the content by the content server.

45. The apparatus of claim 44 wherein the meta data includes an authorized network device type.

46. The apparatus of claim 45 wherein the middleware filter reads the meta data of the content received from the content server and sends the content to the network device if the authorized network device type of the read meta data matches a network device type associated with the network device.

47. The apparatus of claim 46 wherein the middleware filter stores the network device type of the network device.

48. The apparatus of claim 44 wherein the meta data includes data synchronization information corresponding to the data synchronization.

49. The apparatus of claim 48 further comprising a display to display the data synchronization information.

50. The apparatus of claim 44 wherein the data synchronization is a one-way data synchronization.

51. The apparatus of claim 44 wherein the data synchronization is a bi-directional data synchronization.

52. The apparatus of claim 44 wherein the apparatus comprises a personal computer.

53. The apparatus of claim 44 wherein the network device comprises a personal digital assistant.

54. The apparatus of claim 44 wherein the content server comprises a web server.

55. The apparatus of claim 44 wherein the apparatus comprises a server.

56. An apparatus for filtering synchronized data comprising:
   a. means for determining content to be sent from a content server to a first network device during a data synchronization;
   b. means for sending the content from the content server to a second network device coupled between the content server and the first network device, wherein the second network device includes a middleware filter;
   c. means for selectively filtering the content in response to meta data contained within the content, wherein the meta data comprises a data type of the content; and
   d. means for sending only the filtered content from the second network device to the first network device,
      wherein selectively filtering the content includes reading the meta data of the content received from the content server by the middleware filter, matching the data type of the read meta data to an authorized data type associated with the first network device, and sending the content to the first network device if the data type of the read meta data matches the authorized data type associated with the first network device, wherein the middleware filter stores the authorized data type of the first network device, and
   wherein the meta data is added to the content by the content server.

57. A network of devices to filter synchronized data, the network of devices comprising:
   a. a content server to store content;
   b. a first network device, wherein a communications channel is established for communicating content from the content server to the first network device; and
   c. a middleware filter coupled to the first network device and to the content server such that during a data synchronization, all content sent over the communications channel from the content server is received by the middleware filter according to the data synchronization and the middleware filter is programmed to selectively filter the content in response to meta data containing device specifications within the content resulting in filtered content and send only the filtered content to the first network device, wherein the meta data comprises a data type of the content,
      wherein the middleware filter reads the meta data of the content received from the content server and sends the content to the first network device if the data type of the read meta data matches an authorized data type associated with the first network device,
      wherein the middleware filter stores the authorized data type of the first network device, and
      wherein the meta data is added to the content by the content server.

58. A network of devices to filter synchronized data, the network of devices comprising:
   a. a content server to store content;
   b. a first network device; and
   c. a second network device coupled between the first network device and the content server, the second network device comprising a middleware filter, such that during a data synchronization, content is received by the middleware filter from the content server according to the data synchronization and the middleware filter is programmed to selectively filter the content in response to meta data within the content, the metadata comprising an attribute-value pair, resulting in filtered content and send only the filtered content to the first network device, wherein the meta data comprises a data type of the content, and further wherein the first network device and the second network device are local and the content server is remote from the first network device and the second network device,
      wherein the middleware filter reads the meta data of the content received from the content server and sends the content to the first network device if the data type of the read meta data matches an authorized data type associated with the first network device, wherein the middleware filter stores the authorized data type of the first network device, and
      wherein the meta data is added to the content by the content server.

59. A method of filtering synchronized data, the method comprising:
   a. determining content to be sent from a content server to a first network device during a bi-directional data synchronization;
   b. sending the content from the content server to a second network device coupled between the content server and the first network device, wherein the second network device includes a middleware filter;
   c. selectively filtering the content according to the middleware filter in response to meta data contained within the content, wherein the meta data comprises a data type of the content; and
   d. sending only the filtered content from the second network device to the first network device,
      wherein selectively filtering the content includes reading the meta data of the content received from the content server by the middleware filter, matching the data type of the read meta data to an authorized data type associated with the first network device, and sending the content to the first network device if the data type of the read meta data matches the authorized data type associated with the first network device,
      wherein the middleware filter stores the authorized data type of the first network device, and
      wherein the meta data is added to the content by the content server.

60. A network of devices to filter synchronized data, the network of devices comprising:
   a. a content server to store content;
   b. a first network device; and
   c. a middleware filter coupled to the first network device and to the content server such that during a bi-directional data synchronization, content is received by the middleware filter from the content server according to the bi-directional data synchronization and the middleware filter is programmed to selectively filter the content resulting in filtered content and send only the filtered content to the first network device, wherein the middleware filter selectively filters the content in response to meta data within the content, wherein the meta data comprises a data type of the content,
      wherein the middleware filter reads the meta data of the content received from the content server and sends the content to the first network device if the data type of the read meta data matches an authorized data type associated with the first network device,
wherein the middleware filter stores the authorized data type of the first network device, and
wherein the meta data is added to the content by the content server.

* * * * *